United States Patent [19]

Müller et al.

[11] 4,135,564
[45] Jan. 23, 1979

[54] SKID PROTECTION FOR VEHICLE TIRES

[75] Inventors: Anton Müller, Aalen-Unterkochen; Hubert König, Aalen; Helmut Magiera, Aalen-Hofherrnweiler, all of Fed. Rep. of Germany

[73] Assignee: Eisen- und Drahtwerk Erlau Aktiengesellschaft, Aalen, Fed. Rep. of Germany

[21] Appl. No.: 847,560

[22] Filed: Nov. 1, 1977

Related U.S. Application Data

[63] Continuation of Ser. No. 669,320, Mar. 22, 1976, abandoned.

[30] Foreign Application Priority Data

Mar. 29, 1975 [DE] Fed. Rep. of Germany ....... 2513984

[51] Int. Cl.² .......................... B60C 7/22; B60C 27/20
[52] U.S. Cl. ..................................... 152/182; 152/189; 152/228
[58] Field of Search ............... 152/169, 170, 178, 182, 152/185, 187, 190, 191, 200–201, 219, 221, 222, 225 R, 239–243, 171, 172, 189, 223, 224, 231; 301/42, 44T; 305/19, 34

[56] References Cited

U.S. PATENT DOCUMENTS

| | | | |
|---|---|---|---|
| 1,379,336 | 5/1921 | Erik | 152/242 X |
| 1,742,942 | 1/1930 | Thompson | 301/44 T |
| 3,595,293 | 7/1971 | Müller | 152/243 |
| 3,766,957 | 10/1973 | Witzel | 152/242 |
| 3,870,094 | 3/1975 | Schurle et al. | 152/239 X |
| 3,892,268 | 7/1975 | Asbeck | 152/172 |
| 3,899,220 | 8/1975 | Grawey et al. | 305/19 |

FOREIGN PATENT DOCUMENTS 471696 6/1969 Switzerland .............. 152/219

Primary Examiner—Stanley H. Tollberg
Assistant Examiner—Fred A. Silverberg
Attorney, Agent, or Firm—Walter Becker

[57] ABSTRACT

A skid protecting device for use in combination with vehicle tires, according to which in distribution over the tire circumference there are provided holders with a plurality of gripping profiles which are arranged transverse to and in covering engagement with gripping profiles which are adapted by way of tensioning members to be connected to the outsides of the holder. The arrangement comprises at least one chain net of interengaging chain links which is located on one lateral surface of the tire. This at least one chain net has one rim portion provided with serially arranged connecting links arranged in spaced relationship to each other for connection to the holders, whereas an oppositely located other rim portion is provided with a tensioning or tightening strand extending along the last mentioned other rim portion.

5 Claims, 8 Drawing Figures

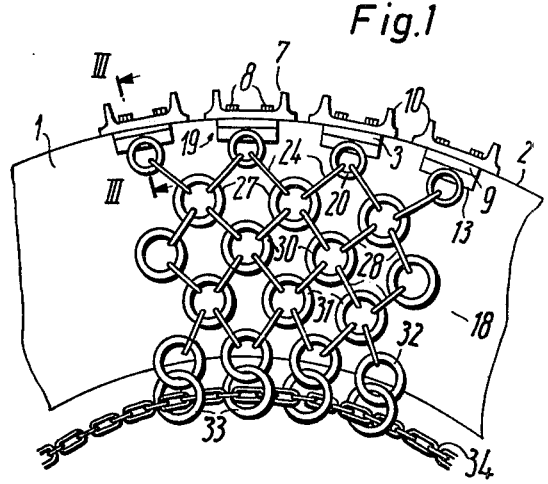
Fig.1
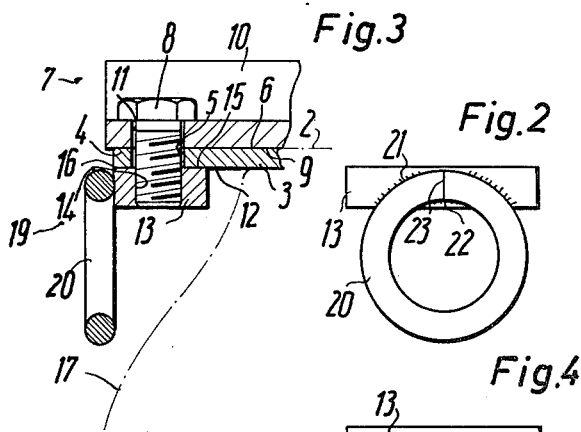
Fig.3 Fig.2
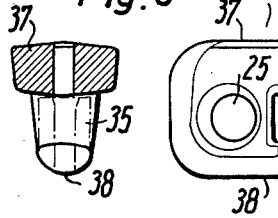 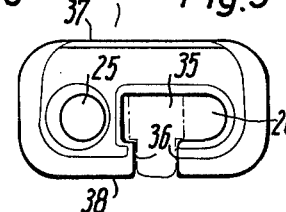
Fig.6 Fig.5 Fig.4
 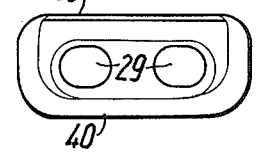
Fig.8 Fig.7

SKID PROTECTION FOR VEHICLE TIRES

This is a continuation application of Ser. No. 669,320, filed Mar. 22, 1976, now abandoned, being based on German patent application Ser. No. P 25 13 984.8 filed Mar. 29, 1975 as claimed for priority under 35 USC 119.

The present invention relates to a skid protecting device for tires which comprises holding means firmly anchored in the running portion and distributed over the tire circumference, and in particular comprises a device of this type which has a plurality of gripping profiles transversely covering the running surface, which profiles are adapted by means of tensioning elements to be connected to the outside of the holding means.

Heretofore known anti-skid devices for tires of the above mentioned type are intended merely to prevent the tires from skidding on the ground. In contrast thereto, it is an object of the present invention so to design an anti-skid protective device for tires of the above mentioned general type that the device in addition to assuring an anti-skid protection will also protect the tire flanks against damage. This is of particular importance when the vehicles equipped with tires of the type involved have to move over rocky terrain.

These objects and other objects and advantages of the invention will appear more clearly from the following specification in connection with the accompanying drawing, in which:

FIG. 1 represents a side view of a cut-out of a tire protective device according to the present invention.

FIG. 2 illustrates on a larger scale than that of FIG. 1 a side view of a link of the tire protective device of FIG. 1.

FIG. 3 represents a section taken along the line III—III of FIG. 1 on approximately the same scale as FIG. 2.

FIG. 4 shows a top view of the link according to FIG. 2.

FIGS. 5 to 8 respectively illustrate two links of the tire protective device of FIG. 1 in view and in section on a larger scale than that of FIG. 1.

The skid protective device for tires according to the present invention which comprises holding means firmly anchored in the tread portion and distributed over the tire circumference while being provided with a plurality of gripping profiles transversely covering the running surface is characterized primarily by at least one chain net which is to be arranged on one side surface of the tire and which consists of interengaging chain links while at one rim portion of said chain net, link elements are provided which are arranged in spaced relationship one behind the other for connection to the holding means and while at the other rim portion of said chain net there is provided a tensioning strand extending along said other rim portion.

The width of the chain net is expediently so widened that the net extends from the link elements at least up to the rim of the vehicle wheel. The chain net may by means of link elements be post-connected to the tire protective device formed by the gripping profiles. Inasmuch as the link elements are connected to the holding means, a safe hold and a precise alignment of the chain net relative to the tires will be assured. By means of the tensioning strand, the chain net is after it has been properly mounted pulled taut so that it will engage the tire and cannot laterally be displaced.

Referring now to the drawing in detail, the tire protective device shown in FIG. 1 is intended for a tire 1 the running portion of which has embedded therein plate-shaped holding means 3 which are firmly anchored in said running portion. The holding plates 3 which are uniformly distributed over the tire circumference are spaced from each other by a distance which is less than its width. These holding plates 3 laterally freely project beyond the tire 1 and at its projecting ends 4 are respectively provided with equal size bores, the central axes of which are located in a common plane extending at a right angle to the tire axis. The surfaces 6 of the embedded holding plates 3 are exposed and are located on the outer surface of the tread portion and in the plane of the running surface 2. The holding plates 3 may respectively extend over the entire tire width and may project at both sides beyond the tires. However, it is also possible respectively to arrange two holding plates 3 which are flush with each other and extend transverse to the running direction so that at both sides of the running surface 2 there are respectively provided one of said two plates. The gripping profiles 7 are by means of screws 8 connected to the holding plates 3. These profiles 7 have their bottom side 9 arranged parallel to the holding plates and extend over the entire width of the running surface 2. The profiles 7 extend in running direction to a greater extent than the holding plates and are symmetrically arranged with regard to these plates. The distance between gripping profiles 7 arranged adjacent to each other is considerably less than the distance between adjacent holding plates 3. The bottom sides 9 of the gripping profiles 7 are plane and with their entire surface engaging the surfaces 6 of the holding plates 3. The projecting bottom sides of the gripping profiles 7 which project beyond the holding plates 3 engage the running surface 2 of the tire. Each profile 7 has two parallel gripping webs 10 which taper in the direction toward the free ends and which are spaced from each other by a distance approximately equalling the width of the holding plate 3. Two screws are arranged between the gripping webs 10 and extend through bores 11 which are located in the plate-shaped portion of the gripping profiles 7 which portion is located between the gripper webs 10. These bores 11 are in alignment with the bores 5 of the holding plates 3 which are likewise passed through by the screws 8.

On those surfaces 12 of the projecting ends 4 of the holding plates 3 which face toward the tire axis, there are respectively provided tensioning plates 13 which are thicker than the holding plates and which respectively comprise two threaded bores 14 for engagement with the screws 8. The tensioning plates 13 have a plane tensioning surface 14 in engagement with the surface 12 and are tensioned relative thereto by two screws 8. The gripping profiles 7 are by the same screws connected to the tensioning plates 13 and the holding plates 3. The tensioning plates 13 have a longitudinal rectangular shape with their longitudinal edges extending in the tire circumferential direction. The edge length of said longitudinal edges equals the width of the projecting ends 4 of the holding plates 3 in such a way that the narrow edge and the outer longitudinal edge 16 of the tensioning plates 13 are flush with the corresponding edges of the holding plate 3. The distances of the threaded bores 14 from the outer longitudinal edge 16 are slightly less than the distances from the other longitudinal edge which is located directly adjacent to the lateral surface of the tire and which is indicated by dot-dash lines in FIG. 3.

For protecting the flanks 17 of the tire 1, the tire protective device according to the invention has two chain nets 18 which are respectively connected to the projecting ends 4 of the holding plates 3 and which cover the entire pertaining lateral tire surface from the bottom sides of the profile 7 to the rim. The tensioning plates 13 form components of link members 19 which serve for connecting the radially outer rim portion of the pertaining chain net to the holding plates 3. Each link element 19 in addition to comprising the tensioning plate 13 also has a ring 20 which is bent out of round steel and which engages the outer longitudinal edge 16 of the pertaining tensioning plate 13 by means of an end face and is connected to said outer longitudinal edge 16 by means of welding seams 21,22. The thickness of ring 20 is less than the thickness of the tensioning plate 13 so that within the region of the outer circumferential surface as well as within the region of the inner circumferential surface of ring 20 welding seams 21 can be provided. Provided on the outer circumference of ring 20 are two welding seams 21 which are spaced from each other and are arranged on both sides of the central plane of ring 20 which central plane extends at a right angle to the tensioning plate 13. Ring 20 is slightly set back relative to the tensioning surface 15 of tensioning plate 13 so that its safe engagement of the tensioning plate 13 with the holding plate 3 will also be assured when the ring 20 extends below the holding plate 3. The rings 20 are bent of steel wire sections the ends of which are abutting each other and are interconnected by welding seams 23. The welding seam 23 of each ring 20 is located within the region of the pertaining tensioning plate 13 in the middle between the welding seams 21 so that a high strength will be realized and that that ring section which projects beyond the tensioning plate 13 will be free from welding seams and thereby will be smooth. The outer diameter of the ring 20 is slightly less than the length of the tensioning plate 13 but is greater than the distance between the central axes of the threaded bores 14 so that the ring 20 on one hand will not laterally project beyond the tensioning plate 13 and on the other hand will greatly increase the strength of the tensioning plate 13. Inasmuch as the rings 20 extend at a right angle to the tensioning surfaces 15 of the tensioning plates 13, the rings 20 are with the lateral net 18 in mounted position located on the respective side of tire 1 in a common plane which extends at a right angle to the tire axis.

The rings 20 have the major portion of their circumference projecting beyond that surface of the pertaining tensioning plate 13 which faces away from the tensioning surface 15. This portion has relative to the ring axis an arc angle of about 240°. In the projecting part of each circular ring 20 there are detachably suspended two web links 24 which in side view according to FIG. 1 define with each other an angle of approximately 90°. These web links 24 are designed as hook members in conformity with FIGS. 5 and 6. The web links 24 which in side view have a longitudinal rectangular plate-shaped form, have adjacent to a narrow edge a receiving opening 25 which is closed over the circumference. The webs 24 furthermore adjacent to the other narrow edge have a hook opening 26 which is open at that longitudinal side which faces the tire 1, for introducing a ring 20. The receiving opening 25 and the hook opening 26 extend through the side surfaces of the web ring 24 and have a width which is only slightly greater than the cross section of the respective engaging link so that the web links 24 in mounted condition are located at a right angle to the ring links 20 and at a right angle to the pertaining side surface of the tire. The receiving opening 25 of each web link 24 is engaged by a circular ring link 27 which is bent out of round steel and the outer diameter of which approximately equals the length of the web link 24. The outer diameter of link 27 as well as its cross section have the same size as with the rings 20. Each ring link 27 is engaged by two web links 24 linked to two adjacent ring links 20, and by two additional web links 28 according to FIGS. 7 and 8.

The web links 28 have approximately the same basic shape as the web links 24 but have two receiving openings 29 which are closed over the circumference and extend through the side surfaces of the web links 28. The openings 29 are respectively engaged by ring links 30. These ring links 30 are designed similar to the design of the ring links 27 while four web links 28 engage each ring link 30. Two of these web links 28 are connected with two adjacent ring links 27, and the two remaining web links 28 are connected to two additional adjacent ring links 31 of a design similar to that of ring links 27. These ring links 31 are likewise engaged by two web links 28 of which the two web links which face away from the ring links 30 respectively engage two adjacent additional ring links 32. With the chain net 18 in mounted condition, the ring links 27 and 30–32 are arranged in concentric circular zones about the tire axis. Adjacent ring links of adjacent circular zones are only through the intervention of a single web link connected to each other. All web links 28 comprise so narrow receiving openings 29 that they are located at a right angle to the lateral surface of the tire and of the ring links. The number of the ring links in each circular zone equals the number of the links 19.

A circular ring link 33 is each suspended in the ring links 32 which are located on the radial inner rim of the chain net 18. The ring link 33 has about the same size as the remaining ring links. A tightening or tensioning strand 34 is passed through the ring openings of the ring links 33 which are located opposite the ring links 32 at an incline. The strand 34 extends nearly annularly about the tire axis when the chain net 18 is in its mounted position. The clamping strand 34 is formed by a link chain of substantially identical flat oval chain links which latter are bent of round steel and are closed by welding. The cross section of the material of the chain link is considerably less than that of the ring links. Furthermore, the chain division of the clamping strand 34 is less than the inner diameter of the ring links 33 so that the clamping strand 34 is relatively flexible and for purposes of tensioning the chain link 18 can easily be pulled through the ring links 33. The ends of the clamping strand 34 which expediently are detachably interconnected are connected to each other by means of a non-illustrated tensioning device by means of which the tensioning strand 34 and thereby the chain net 18 can be tensioned. By tensioning the tensioning strand 34, also the holding plates 13 are clamped against the tire.

The web link 24 which is illustrated in FIGS. 5 and 6 and which is substantially symmetrical with regard to its longitudinal central plane, comprises a detachable closure member 35 illustrated in dot-dash lines. The closure member 35 comprises a broad section which is located in the hook opening 26. Furthermore, the closing member 35 has a narrower section which engages the inlet opening of the web link 24 and by means of its lateral surfaces engages approximately the confining surfaces 36 of said inlet opening. The confining surfaces 36 are located approximately at a right angle with regard to the longitudinal central plane of the web link 24 and are spaced from each other by a distance which approximately equals the distance between the confining surfaces of the hook opening 26. The confining surfaces of the hook opening 26 are located at the right angle to the confining surfaces 36 and according to the view of FIG. 5 are parallel to the longitudinal direction of the web link 24. The closure member 25 has the end surface of its widened section in engagement with one uninterrupted confining surface of the hook opening 26 and between the two sections has on both sides merging shoulders by means of which a closure member 35 engages the other confining surface of hook opening 26 at both sides of the insert opening. The closing member 35 which nearly completely fills in the insert opening does laterally not project beyond the link body of the web link 24. The closing member 25 is secured by means of a pin which is detachably pressed into aligning bores of the closing member and of the web link and the central axis of which is located approximately in the longitudinal central plane of the web link 24 as well as at a right angle to the longitudinal direction of the web link. The web link 24 has a flat surface. The web link 24 has a running surface 37 and a tire engaging surface 38 which faces away from the running surface 37. These two surfaces 37 and 38 extend transverse to the lateral surfaces of the web link 24, and through these lateral surfaces there extend the receiving opening 25 and the hook opening 26. The running surface 37 which is intended for contact with the road and which protects the tire when the same is in contact with a slope or the like, is about twice as wide as the tire engaging surface 38. The running surface 37 is formed by a widened section of the web link 24 which extends to those confining surfaces of the receiving opening 25 and of the hook opening 26 which are adjacent to the running surface 37. According to the cross section shown in FIG. 6, the web link 24 is from said confining surfaces to the tire engaging surface 38 narrower, while from the confining surfaces to the tire engaging surface 38 the web link 24 in cross section tapers in a wedge-shaped manner. The tire engaging surface 38 is in cross section curved in a partially circular manner. The receiving opening 25 and the hook opening 26 are located closer to the tire engaging surface 38 than to the running surface 37. Furthermore, the insert opening extends through the tire engaging surface 38 while the pertaining end surface of the closing member 35 forms a longitudinal section of the tire engaging surface 38 and in cross section has the same shape as the remaining sections of the tire engaging surface. The bore in the web link 24, which is provided for receiving the pin, extends only through the section which forms the running surface 37. The pin is located symmetrically with regard to the central plane of the insert opening of the web link 24 while the pertaining bore is provided in the central axis of the closing member 35.

The web links 28 which are designed in conformity with FIGS. 7 and 8, likewise comprise a running surface 39 and a tire engaging surface 40. However, the distance between these surfaces is about ¼ less than is the case with the web links 24 so that the running surfaces of the web links 24, 28 will in mounted condition of the lateral net 18 be located approximately in one plane although the tire is within the region of the running surface 2 narrower than within the region of the flanks 17. The running surface 39 of the web link 28 has a narrower width than the running surface of the web link 24. The web link 24 in cross section from the running surface 39 to the tire engaging surface 40 tapers in a wedge-shaped manner whereas the web link 24 in cross section is step-shaped. The receiving openings 29 of the web link 28 are in conformity with FIG. 7 flat oval and extend in the longitudinal direction of the web link 28. The diameter of the receiving opening 25 and the width of the opening 26 and of the receiving openings 29 is only slightly greater than the cross section of the rings 20 and ring links 27 so that the web links cannot tilt relative to the rings and ring links. Due to the described design, a relatively high rigidity of the lateral net 18 against tilting movements of the web links and against movements of the lateral net 18 in the direction of the tire axis is realized. Nevertheless, adjacent links of the lateral net 18 can relative to each other carry out movements within narrow limits in connection with which the ring links can turn relative to the web links about their central axes.

It is, of course, to be understood that the present invention is, by no means, limited to the specific showing in the drawing, but also comprises any modifications within the scope of the appended claims.

What is claimed is:

1. In combination with an anti-skid chain system for a vehicle tire having an axis and tire flanks as well as a circumferential running surface therewith and which provides holding means distributed over the circumference of the tire and securely anchored to the running surface of the tire, a plurality of approximately U-formed gripping profiles extending transverse to the running surface as well as projecting laterally thereof and connected to the holding means adjacent to the tire flanks, said profiles being securely anchored in the running surface whereby fastening of the gripping profiles with the holding means occurs along the circumferential direction of the tire by chain net means having improvement therewith which comprises a tension plate means including outer longitudinal edging and a ring means welded thereto at right angles to the tire axis for the chain net means provided with a plurality of annular members, two web links embodied as hook members engaged in each ring means and located at essentially right angles to the tire flank as well as being parts of said chain net means covering the tire flank with the ring members being essentially parallel to the tire flank, adjoining pairs of hook members in tire peripheral direction being connected by one ring means, and tensioning means engaging and extending through said annular members and operable to tension said chain net means and also provided with said web links engaged with said ring means, said chain net means forming a tight mesh network substantially covering the tire flanks, said ring means and said annular members having essentially equal measurements and being equal to each other in number.

2. A combination according to claim 1, in which said ring means projects over and beyond said pertaining tension plate means thereof.

3. A combination according to claim 2, in which outer diameter of said ring means is smaller than length of said tension plate means in circumferential direction of the tire and greater than spacing of middle axes of threaded bores in said tension plate means adjoining each other in tire peripheral direction.

4. A combination according to claim 3, in which fastening screws are provided to interconnect gripping profiles and holding means, said screws being spaced circumferentially an amount less than outer diameter of said ring means.

5. A combination according to claim 4, in which thickness of said ring means is smaller than thickness of said tensioning plate means, said ring means being offset from said tensioning plate means.

* * * * *